United States Patent [19]

James

[11] Patent Number: 4,458,697
[45] Date of Patent: Jul. 10, 1984

[54] AXIAL FLOW COMBINE WITH VERTICALLY OFFSET ACCELERATOR ROLLS

[75] Inventor: Larry R. James, Olathe, Kans.

[73] Assignee: Allis-Chalmers Corp., Milwaukee, Wis.

[21] Appl. No.: 460,579

[22] Filed: Jan. 24, 1983

Related U.S. Application Data

[63] Continuation-in-part of Ser. No. 283,975, Jul. 16, 1981, Pat. No. 4,369,617.

[30] Foreign Application Priority Data

Apr. 13, 1982 [CA] Canada .................................. 400820

[51] Int. Cl.³ .............................................. A01F 12/00
[52] U.S. Cl. ................................... 130/27 Q; 56/14.6
[58] Field of Search ............ 56/14.6; 130/27 Q, 27 H, 130/27 J, 27 T, 27 HF, 27 R

[56] References Cited

U.S. PATENT DOCUMENTS

| | | | |
|---|---|---|---|
| 4,007,744 | 2/1977 | Shaver | 130/27 Q |
| 4,103,691 | 8/1973 | Shaver | 130/27 Q |
| 4,154,250 | 5/1979 | Stuber | 130/27 H |
| 4,180,081 | 12/1979 | Shaver | 130/27 Q |
| 4,270,551 | 6/1981 | Johnston et al. | 56/14.6 |

FOREIGN PATENT DOCUMENTS 604936  5/1960  Italy .................. 130/27 Q

Primary Examiner—Paul J. Hirsch
Attorney, Agent, or Firm—Charles L. Schwab

[57] ABSTRACT

An axial flow combine (11) includes a processor (33) at an elevated position in a housing (63) providing adequate space between the processor (33) and the housing walls (64, 66, 62, 67, 68) to insure gravity movement of threshed material exiting the cage (34) to a single distribution auger (37) and to a slot (69) feeding a pair of vertically offset accelerator rolls (41, 42).

3 Claims, 7 Drawing Figures

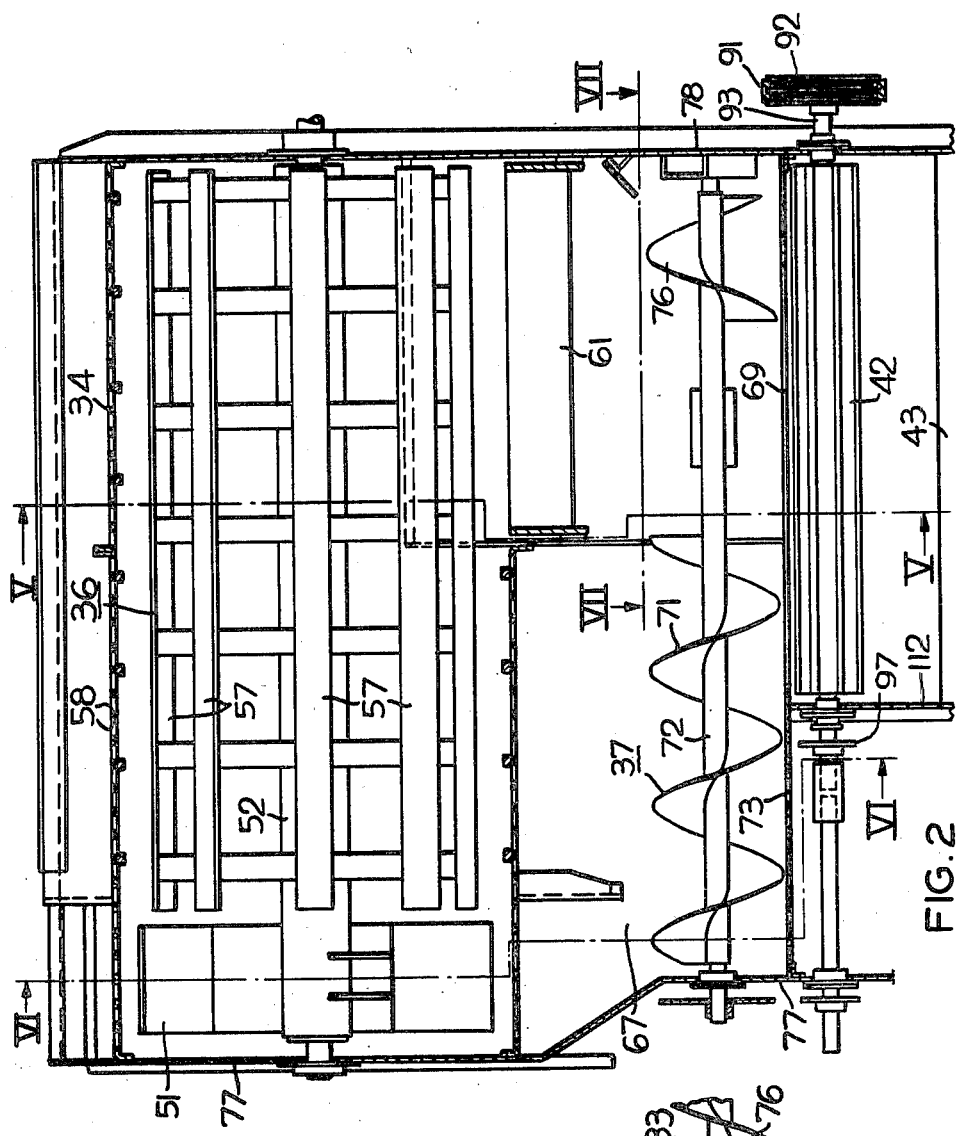
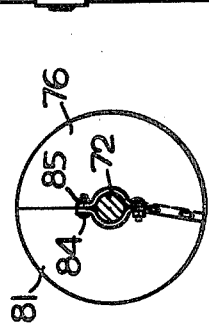
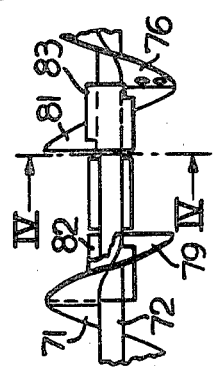

4,458,697

AXIAL FLOW COMBINE WITH VERTICALLY OFFSET ACCELERATOR ROLLS

RELATED APPLICATIONS

This application is a continuation-in-part of copending U.S. patent application Ser. No. 283,975 filed July 16, 1981 entitled "Feeder Idler Drum Shaft with Removable Extensions" now U.S. Pat. No. 4,369,617 issued Jan. 25, 1983.

BACKGROUND OF THE INVENTION

1. Technical Field

This invention relates to an agricultural harvester and, more particularly, to an axial flow combine utilizing accelerator rolls.

2. Prior Art

Combines are currently being marketed utilizing an axial flow threshing and separating cylinder or rotor in which threshed material is accelerated downwardly toward the cleaning section of the combine by a pair of accelerator rolls and in which a rearwardly directed air stream intersects the downwardly accelerated threshed material blowing chaff and small stalk particles rearwardly from the combine. Such a prior art combine is illustrated in U.S. Pat. No. 4,007,744 to J. Lyle Shaver issued Feb. 15, 1977 and entitled "Grain Accelerator Precleaner." In the beforementioned prior art combine, a pair of side-by-side accelerator rolls are disposed on parallel horizontal axes lying in a common horizontal plane.

BRIEF DESCRIPTION AND OBJECTS OF THE INVENTION

The present invention is advantageously used in an axial flow combine having a threshing section which includes a rotor disposed on a generally horizontal axis, a concave on the underside of the rotor and a cleaning section having a grain pan below the concave. A pair of front and rear accelerator rolls are disposed above the grain pan and in underlying relation to the concave. The accelerator rolls are disposed on a pair of generally horizontal and parallel axes for receiving therebetween the threshed material from the concave. The axis of the front accelerator roll is vertically offset above the axis of the rear accelerator roll, causing threshed material to be accelerated in a downwardly and forwardly direction en route to the grain pan. Power means are provided for driving the accelerator rolls in opposite directions so that the threshed material passes therebetween and air delivery means are provided which direct a predetermined horizontal rearward flow of air through and transverse to the accelerated threshed material passing from the accelerator rolls so as to blow chaff and chaff particles rearwardly from the kernels of grain passing downwardly to the grain pan.

It is an object of the present invention to provide a combine in which the cleaning section is moved forwardly so as to decrease the overall length of the combine and to decrease the distance crop material (other than grain) must travel from the threshing section to a downwardly directed opening at the rear of the combine.

It is a further object of the present invention to reduce the overall length of the combine and thereby permit economics in reduced materials and weight as well as reducing the discharge distance of the crop content being discharged from the threshing section of the combine thereby obviating the need for an additional discharge impeller or the like.

BRIEF DESCRIPTION OF THE DRAWINGS

One embodiment of the invention is shown in the drawings in which:

FIG. 2 is a transverse vertical section through the combine along the line II—II in FIG. 1;

FIG. 3 is a partial view of a distribution auger showing addition of removable flight sections;

FIG. 4 is a view taken along the line IV—IV in FIG. 3;

DETAILED DESCRIPTION OF THE DRAWINGS

Figure 1:
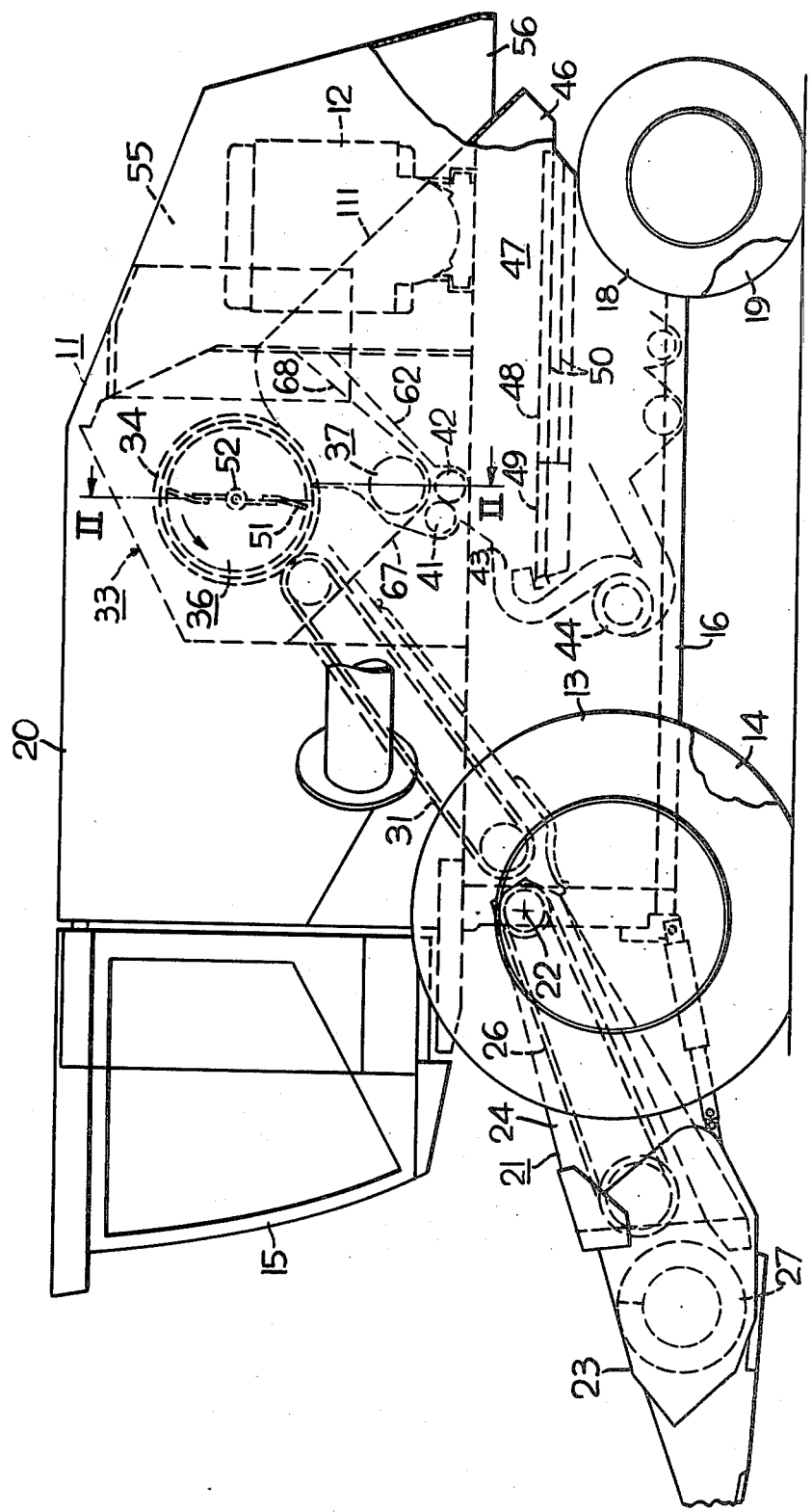
FIG. 1 is a left-hand side view of a combine.

Referring to FIGS. 1 and 2, an agricultural harvester in the form of a combine 11 is powered by an internal combustion engine 12 mounted on a main frame 16 and connected by a drive train (not shown) to a pair of front drive wheels 13, 14. The main frame 16 of the combine supports an operator's cab 15 and a grain bin 20 and the rear end of the frame 16 is supported by a pair of steerable wheels 18, 19. A header assembly 21 at the front of the combine has its rear end pivotally connected on a transverse horizontal axis 22 to the main frame 16 and includes a header 23 and a conveyor housing 24 in which a conveyor 26 is disposed. Crop material cut by the header mechanism 23 is moved laterally inward by a transverse auger 27 to a central position were it is conveyed rearwardly by the conveyor 26 to the front end of a second conveyor 31 which in turn conveys the material rearwardly to a processor or threshing section 33 of the combine 11. The crop material conveyed rearwardly by the conveyor 31 enters a radial crop receiving opening in a cylindrical, foraminous cage 34 where it is threshed by a rotor 36 supported on left and right sidewalls 77, 78 which rotates counterclockwise as viewed in FIG. 1 and which is coaxial to the cage 34. Threshed material passing through the radial openings 58 of the foraminous cage and openings in an underlying concave 61 falls downwardly to a distribution auger 37 which moves the material laterally to a transverse downwardly open discharge slot above a pair of equal diameter accelerator rolls 41, 42. The accelerator rolls 41, 42, which have overlapping lugs which mesh without touching, accelerate the threshed material downwardly across an air stream delivered rearwardly from an air outlet 43 by a transverse fan 44. The air discharged from the outlet 43 blows the chaff and small stalk particles rearwardly where they are discharged through an opening 46 at the rear of the cleaning section 47. The cleaning section 47 includes a shaker assembly 48 having a grain pan 49 at its front end and screens 50 at the rear of the grain pan. Straw and coarse material which does not pass through the concave or the radial openings 58 in the cage 34 is thrown rearwardly into a chute 55 from the threshing section 33 by way of a radial outlet or opening in the cage 34 by a paddle assembly 51 on the left-hand end of the rotor shaft 52. The material thrown rearwardly by the paddle assembly 51 through the cage outlet passes through the discharge chute 55 and discharges through a downwardly open discharge opening 56.

Figure 5:
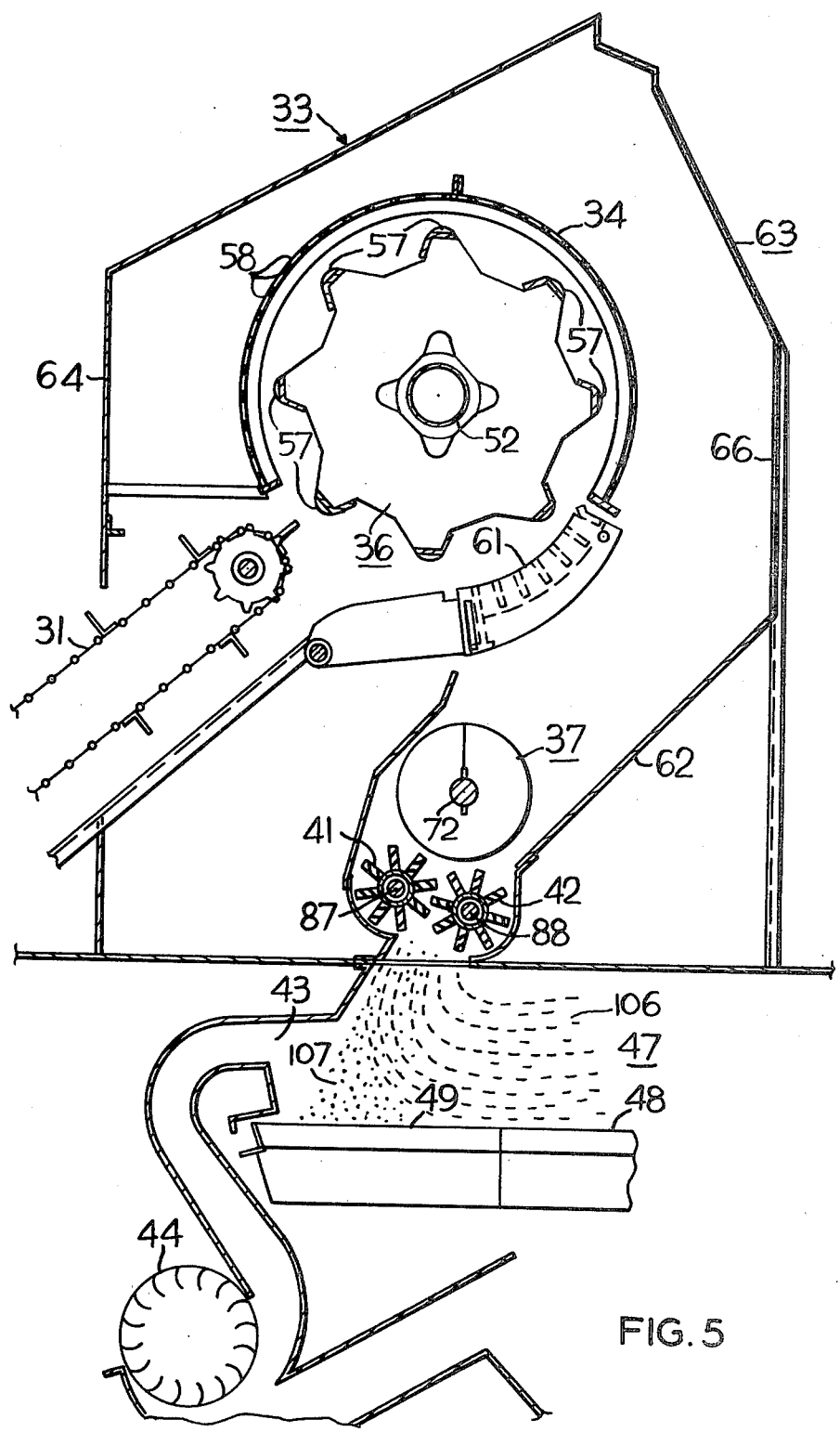
FIG. 5 is a view taken along the line V—V in FIG. 2.

Referring also to FIGS. 3 through 7, the crop material delivered by the upper conveyor 31 to the foraminous cage 34 is impacted by the rasp bars 57 of the rotor 36 thereby causing grain to be separated from the crop material which then passes through openings in the concave 61 and through the radial openings 58 of the cage 34. As seen in FIG. 5, the threshed material passing radially from the cage 34 falls downwardly to a sloping wall portion 62 of the processor housing 63 in which the cage 36 is positioned. It will be noted that the rotor 36 and cage 34 of the processor 33 are positioned at an elevation position on the combine in order to provide a generous amount of fore and aft distance between the front wall 66 of the housing 63 and the cage 34 and between the rear wall 66 of the housing 63 and the cage 34. The elevated position also permits the downwardly converging portions 67, 68 and 62 of the front and rear walls 64, 66 to be pitched at a relatively steep angle. For instance, walls 67 and 62 are each pitched at a 45° angle to the horizon and wall 68 is pitched at 51° to the horizon. The ample spacing between the cylindrical cage 34 and the walls 64 and 66 and the steep pitch of the sidewalls 62, 67, 68 insure gravity movement of the threshed material exiting radially from the processor 33 to the single horizontal, transverse distribution auger 37 or to the vertical opening or slot 69 above the accelerator rolls 41, 42. The elevated height of the processor 33 also contributes to the desirable steep downward incline of the bottom wall 111 of the discharge chute 55. The upward offsetting of the accelerator roll 41 relative to the rear accelerator roll 42 permits the shaker assembly 48 to be moved forwardly thus permitting the combine to be shortened and also permitting the discharge chute 55 to be shortened. The shortening of the discharge chute 55 contributes to the steep incline of the bottom wall 111. The wall 111 is sufficiently steep to cause crop material falling thereon to slide by gravity to the downwardly open discharge opening 56. Thus the steep bottom wall 111 of the discharge chute obviates the need for auxiliary energy discharging devices such as an impeller or other devices to impart additional impetus to crop material discharged by the paddle assembly 51.

Figure 6:
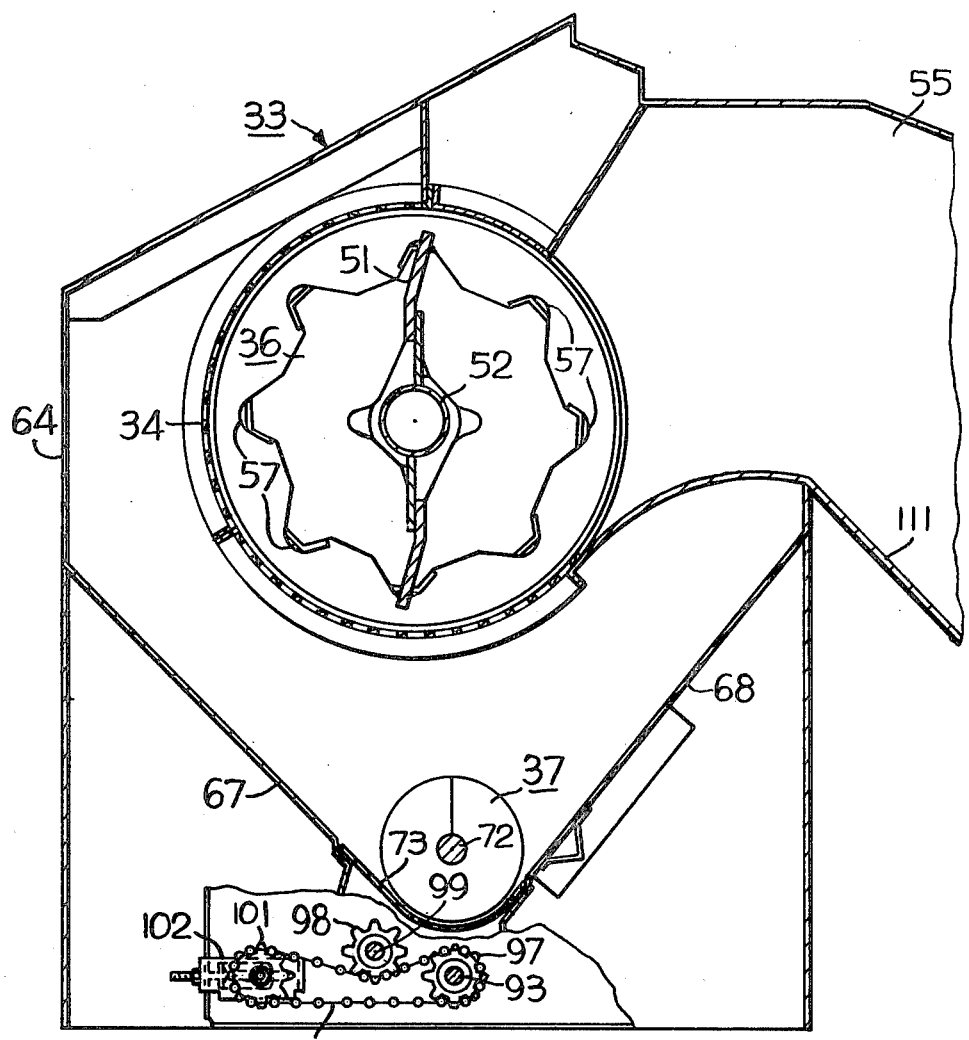
FIG. 6 is a view taken along the line VI—VI in FIG. 2.
Figure 7:
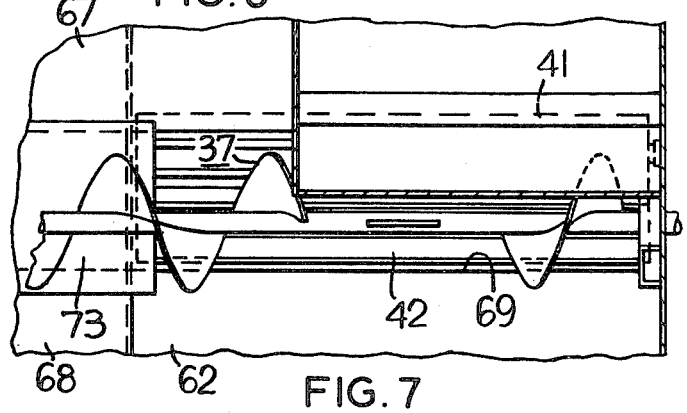
FIG. 7 is a view taken along the line VII—VII in FIG. 2.

The distribution auger 37 has a first flight 71 secured as by welding to the distribution auger shaft 72 which is pitched in a first direction so that upon counterclockwise rotation of the shaft 72, as viewed in FIGS. 5 and 6, it will move threshed material in the auger trough 73 from left to right as viewed in FIG. 2. The distribution auger 37 also includes a flight 76 which is pitched in the opposite direction to the pitch of flight 71 so as to move threshed material falling from the processor 33 from right to left, as viewed in FIG. 2, when it is rotated in a counterclockwise direction as viewed in FIGS. 5 and 6. The ends of the auger shaft 72 are rotatably supported by the laterally opposite upstanding sidewalls 77, 78 of the combine. In some crop or harvesting conditions, it may be desirable to add flight segments 79, 81 to the distribution auger as shown in FIGS. 3 and 4. The flight segments 79, 81 are releasably secured to the shaft by clamping brackets 82, 83 bolted to the segments 79, 81 by bolts 84 and nuts 85. The flighting on the rotating distribution auger 37 effects a desired positioning or distribution of the threshed material to the slot 69 so that the side-by-side accelerator rolls 41, 42 will distribute a band of threshed material to the cleaning section 47.

The accelerator rolls 41, 42 have axes 87, 88 which are generally horizontal and parallel to one another. The front accelerator roll 41 is offset above the rear accelerator roll 42, that is, the axis 87 of accelerator roll 41 is vertically offset above the axis 88 of the rear accelerator roll 42. The accelerator roll 42 is driven through a power train from the engine 12 which includes a V-belt 91 drivingly engaging a pulley 92 nonrotatably secured to the right-hand end of the shaft 93 of accelerator roll 42. As shown in FIG. 6, a chain 96 engages a sprocket 97 on accelerator roll shaft 93 which also engages a sprocket 98 secured to a shaft 99 of accelerator roll 41. An idler sprocket 101 is rotatably mounted on an adjustable support 102 for purposes of obtaining proper tension of the chain 96. The accelerator rolls 41, 42 are rotated in a direction to cause the threshed material exiting the processor 33 to pass between the accelerator rolls 41, 42, the latter being driven at a sufficiently high speed to impart a velocity to the threshed material far in excess of the velocity such material would have if merely falling by gravity. By offsetting the front accelerator roll 41 above that of the rear accelerator roll 42, the threshed material is thrown downwardly and forwardly to the grain pan 49 of the shaker assembly 48. The rearwardly directed layer of air from the transverse fan 44 passes transversely through the accelerated threshed material causing light chaff and crop particles 106 to be blown rearwardly out the discharge opening 46 at the rear of the combine while accelerated clean grain kernels 107 pass downwardly to the grain pan 49.

On reference to FIG. 2, it will be noted that the left-hand wall 112 of the cleaning section is laterally inward from the sidewall 77. Thus, the cleaning section 47 is laterally narrower than the threshing section 33. It should be understood that the shaker assembly 48 extends laterally slightly less than the distance between the sidewall 112 and the left sidewall 78.

The embodiments of the invention in which an exclusive property or privilege is claimed are defined as follows:

1. In a grain harvester having a threshing section including a threshing rotor disposed on a generally horizontal axis and a concave on the underside of said rotor, and a cleaning section having a grain pan below said concave, the combination comprising:
    front and rear accelerator rolls disposed above said grain pan and in underlying relation to said concave, said accelerator rolls being disposed on a pair of generally horizontal and parallel axes and receiving therebetween threshed material from said concave, the axis of said front accelerator roll being vertically offset above the axis of the rear accelerator roll whereby threshed material is accelerated in a downwardly and forwardly direction to said grain pan,
    power means driving said accelerator rolls in opposite directions whereby threshed material passes therebetween, and
    air delivery means directing a predetermined horizontal rearward flow of air through and transverse to the acccelerated threshed material passing from said accelerator rolls to blow chaff and straw particles rearwardly from the kernels of grain which pass downwardly to said grain pan.

2. The harvester of claim 1 wherein said rotor is disposed on a horizontal transverse axis generally parallel to said axes of said accelerator rolls, wherein said rotor includes a discharge paddle at one of its ends and further comprising a fore and aft disposed discharge chute having an entrance opening at its front end receiving crop material discharged by said discharge paddle, a downwardly open discharge opening at its rear end and a bottom wall inclining downwardly to said discharge opening at a steep angle whereby discharge of crop material thrown rearwardly by said impeller passes from the chute through said discharge opening without the impetus of additional energy discharging apparatus.

3. The harvester of claim 1 wherein said accelerator rolls are of equal diameter, are driven at the same speed and have overlapping lugs which mesh without touching.

* * * * *